(12) United States Patent
Ashe et al.

(10) Patent No.: US 7,767,156 B2
(45) Date of Patent: Aug. 3, 2010

(54) TEMPERATURE CONTROL SYSTEM

(75) Inventors: Robert Ashe, Fleet (GB); David Charles Morris, Appleton Warrington (GB)

(73) Assignee: Ashe Morris Ltd (GB)

( * ) Notice: Subject to any disclaimer, the term of this patent is extended or adjusted under 35 U.S.C. 154(b) by 318 days.

(21) Appl. No.: 11/894,294

(22) Filed: Aug. 21, 2007

(65) Prior Publication Data

US 2008/0173439 A1   Jul. 24, 2008

(51) Int. Cl.
*G05D 23/00* (2006.01)
*G01K 17/06* (2006.01)

(52) U.S. Cl. ............... 422/109; 422/110; 422/202; 422/203; 374/39; 374/147

(58) Field of Classification Search ......... 422/109, 422/110, 202, 203; 165/301; 364/557; 374/39, 374/147
See application file for complete search history.

(56) References Cited

U.S. PATENT DOCUMENTS

| | | | | |
|---|---|---|---|---|
| 2,105,882 A | | 1/1938 | Fleisher ............... 165/146 |
| 2,202,946 A | | 6/1940 | Carrier ............... 165/299 |
| 3,080,219 A | * | 3/1963 | Harvey, Jr. ............... 422/62 |
| 3,676,653 A | * | 7/1972 | Arens et al. ............... 702/136 |
| 3,820,590 A | | 6/1974 | Littman et al. ............... 165/292 |
| 4,072,182 A | | 2/1978 | Cheng ............... 122/406.4 |
| 4,132,530 A | * | 1/1979 | Schwimmer ............... 585/263 |
| 4,256,176 A | | 3/1981 | Cohen ............... 165/76 |
| 4,802,532 A | | 2/1989 | Dawes et al. ............... 165/80.03 |
| 4,858,155 A | * | 8/1989 | Okawa et al. ............... 700/274 |
| 4,876,989 A | | 10/1989 | Karpuk et al. ............... 123/3 |
| 4,984,628 A | | 1/1991 | Uchida et al. ............... 165/256 |
| 5,018,086 A | * | 5/1991 | Agarwal ............... 702/136 |
| 5,565,716 A | | 10/1996 | Tierny ............... 307/154 |
| 5,692,556 A | | 12/1997 | Hafner ............... 165/301 |
| 5,730,186 A | | 3/1998 | George ............... 137/625.29 |
| 5,762,879 A | * | 6/1998 | Nomura et al. ............... 422/109 |
| 6,820,428 B2 | | 11/2004 | Wylie ............... 60/772 |
| 7,067,695 B2 | * | 6/2006 | Yada et al. ............... 562/545 |

FOREIGN PATENT DOCUMENTS

| | | |
|---|---|---|
| DE | 3106875 | 9/1982 |
| EP | 1 423 762 | 6/2006 |
| JP | 56 040097 | 4/1981 |
| WO | WO 00/70292 | 11/2000 |

(Continued)

OTHER PUBLICATIONS

Webb, Ralph; "*Principle of Enhanced Heat Transfer*"; 1994; Wiley & Sons; pp. 1-3.

(Continued)

*Primary Examiner*—N. Bhat
(74) *Attorney, Agent, or Firm*—Ohlandt, Greeley, Ruggiero & Perle, LLP

(57) ABSTRACT

A system for the control of the contents of a reactor which employs a control element of variable area containing flowing heat transfer fluid. The area available for the for the control of the contents of the reactor is controlled is changed by opening and closing a bank of conduits in a cascade and the conduits are opened and closed according to a temperature measurement device in the medium whose temperature is to be controlled.

34 Claims, 6 Drawing Sheets

FOREIGN PATENT DOCUMENTS

| WO | WO 02/087752 | 11/2002 |
| --- | --- | --- |
| WO | WO 02/087753 | 11/2002 |
| WO | WO 02/088191 | 11/2002 |
| WO | WO 02/088851 | 11/2002 |
| WO | WO 03/018187 | 3/2003 |
| WO | WO 03/021370 | 3/2003 |

OTHER PUBLICATIONS

Sau-Hai Lam; *"Principles of Fluid Mechanics"*; 1964; Addison-Wesley; p. 21.

Freemantle, Michael; *"Better Control of Batch Reactors"*; C&EN, Reactor Design; Nov. 21, 2005; pp. 51-52.

Ashe, Robert; *"Precison Heating"*; TCE, Reactor Design; Jul. 2006; pp. 44-46.

Spear, Mike; *"Constant Flux Reactor"*; Process Engineering; Feb. 2004; pp. 17-18.

Ashe, Robert; *"Improve Heat Flux Control with Piped Reactor Jackets"*; ALCHE CEP Magazine; Sep. 2003; p. 15.

Ashe, Robert; *"Taking the Heat Off the Process"*; The Chemical Engineer; Jul. 2002; pp. 36-37.

Stevenson, Ms. J; *"More Accurate Heat Transfer to Boost Process Productivity"*; Romeike Limited; www.romeike.com; Aug. 13, 2003; p. 1.

Ashe Morris et al; *"Crystal Faraday UK Awards for Green Chemical Technology"*; The Chemical Engineer; Jul. 2003; pp. S6 and S10.

\* cited by examiner

TEMPERATURE CONTROL SYSTEM

BACKGROUND OF THE INVENTION

1. Field of the Invention

The present invention relates to temperature control systems. In particular the invention relates to systems which provide improved temperature control leading to faster and more accurate temperature control which in turn can lead to more precise operations in many industries and to energy savings.

2. Description of Related Art

Temperature control is widely used in operations ranging from industrial reactions to air conditioning to heating and refrigeration systems. Some operations require more precise control than others, although all such operations involve high-energy consumption and energy savings would be advantageous. The majority of systems rely on activation of the heat transfer system by a signal from the medium whose temperature is to be controlled and the response is to bring heat transfer elements into or out of operation depending upon the requirements of the medium. In many instances, the heat transfer element comprises a conduit through which a heat transfer fluid flows.

The disadvantage of the existing systems is that, outside of a limited operating range, the response of the system to temperature changes is coarse, it is often sluggish and has low resolution. This tends to result in bumpy irregular temperature profiles without the optimum degree of temperature control.

In an article in Collection Czechoslovak Chem. Comm. (Vol 47) (1982) pages 446 to 453 it is proposed to use a variable area cooling surface in which a retractable cooler was immersed into a reaction mixture. Introduction of the cooler into the reaction mixture could be used to increase the cooling effect and retraction from the mixture WOULD result in a decrease in the cooling effect. The article shows that this technique, to some extent, reduces the temperature surges and irregularities in the reaction mixture as it is cooled or heated. Achieving turbulence in the heat transfer fluid with this design is difficult, furthermore it requires complex apparatus to allow for movement of the cooling element whilst ensuring thermal insulation of the reaction vessel and preventing leaking of the reaction mixture.

U.S. Pat. No. 5,762,879 relates to a reaction heat control mechanism in which the heat exchange area is regulated. In U.S. Pat. No. 5,762,879 the regulation is achieved by varying the height of the heat transfer fluid in an external temperature control jacket which surrounds the reactor. Controlling the heat transfer area by this method requires a stable surface which is incompatible with the need to maintain high flows and high turbulence of heat transfer fluids. This leads to sluggish control response and reduced heat transfer capacity.

The quality of temperature control is dependant on how fast the temperature of the heat transfer surface can be raised and lowered. This in turn is dependant on the resistance to heat flow, the thermal gradient and how fast the heat transfer fluid can be delivered to the heat transfer surface.

SUMMARY OF THE INVENTION

We have now developed temperature control systems which will improve these factors and overcome the problems of the earlier systems.

In our PCT Patent Applications PCT/EP02/04651, PCT/EP02/04646, PCT/EP02/04650 and PCT/EP02/04648 we describe improved systems for the monitoring and control of physical and chemical reactions. These systems are concerned with the improved generation of calorimetric data to monitor a reaction and the use of the caloRimetric data to control the reaction. We have now found that certain of the techniques described in United Kingdom Patent Applications can be modified and used to provide improved temperature control in a wide range of activities.

The invention therefore provides a temperature control system which employs a control element containing a heat transfer fluid of variable area wherein the effective area of the control element is changed by opening and closing a bank of conduits which pass through the medium whose temperature is to be controlled in a cascade fashion, to allow or prevent flow of the heat transfer fluid into the conduits the conduits being opened and/or closed according to a signal from a temperature measuring device in the medium whose temperature is to be controlled.

The system of the present invention allows rapid reaction to temperature change and enables the temperature of the heat transfer surface to be raised and lowered rapidly. The factors which influence the rate of heat transfer are:

i) turbulence of the heat transfer fluid. High turbulence reduces the thickness of the stagnant layer of heat transfer liquid at the wall of the heat transfer surface (service side boundary layer). This results in a thin boundary layer which has a lower resistance to heat flow. Accordingly our systems use a high heat transfer fluid velocity for the purposes of achieving a low boundary layer resistance ii) delivery of the heat transfer fluid to the heat transfer surface. For good temperature control, the heat transfer fluid in the conduit should be changed as quickly as possible. The best response is achieved by replacing the fluid in the heat exchanger with a plug of new fluid. The faster this plug travels, the faster the response.

iii) maintaining a high thermal gradient between the process and service fluids over varying heat loads. A high thermal gradient gives a high rate of temperature change at the heat transfer surface. The invention enables a high thermal gradient to be maintained with a falling heat load by reducing the heat transfer area. By way of example, consider the two heat exchangers in the table below:

| Property | Heat Exchanger A. | Heat Exchanger B. |
| --- | --- | --- |
| Surface area | 1 m$^2$ | 0.1 m$^2$ |
| Heat transfer coefficient | 1 kW · m$^{-2}$ · K$^{-1}$ | 1 kW · m$^{-2}$ · K$^{-1}$ |
| Thermal gradient | 10° C. | 100° C. |
| Heat load | 10 kW | 10 kW |

Say the heat load changes to 11 kW and the temperature of Heat Exchanger A overshoots by 1° C. as the system adjusts to the new set point. This represents an excess load of 1 kW. Heat Exchanger B will have a 10° C. overshoot to give the same excess heat load of 1 kW. The rate of heat up in Exchanger B however will be much faster since the rate of change of surface temperature is greater (due to the higher thermal gradient between the heat transfer surface and the heat transfer fluid). Thus the smaller heat exchanger with higher thermal gradients will give faster control response.

Whilst any form of conduit may be used for the heat exchanger, pipes or coils are preferred and the invention will hereafter be described in relation to a coil or coils.

In order for effective operation, the temperature control system should have the following characteristics:

a. a high temperature difference is preferably maintained between heat transfer fluid and the medium whose temperature is to be controlled.
b. the heat transfer fluid must always flow at a reasonable velocity. The velocity will vary with coil size and conditions but it is preferred that it is greater than 0.1 m/s more preferably greater than 1 m/s. Lower velocities will give slower temperature control response.
c. when used for batch processes or multi-purpose duties, the heat transfer equipment should be capable of stable operation over a wide range of energy release/absorption rates. The range will vary according to the nature of the reaction. In the case of batch reactions a very wide operating range will be required.

The heat exchanger is made up of multiple elements. Each element typically consists of a pipe or coil. Below is a simplified method for calculating the size of an individual heat transfer coil element:

The first step is to decide on a nominal size for a given heat transfer coil in terms of heat carrying capacity Q (which is expressed in Watts). For example a nominal capacity of 100 Watts might be selected for an individual coil.

The next step is to select a nominal temperature drop of the heat transfer fluid through the pipe. A high temperature drop of the heat transfer fluid is associated with a low thermal mass of fluid in the pipe, which is desirable (since this will lose it's heat rapidly when a coil in a cascade system is shut off). For example, a nominal temperature drop of the heat transfer fluid might be taken as 1° C.

From this, the mass flowrate of the heat transfer fluid can be calculated from the following formula:

$$Q = m.Cp.(tsi-tso)$$

Where
Q=The nominal heat load (e.g. 100 Watts in this example)
m=Mass flowrate of the heat transfer fluid ($kg.s^{-1}$)
Cp=specific heat of the heat transfer fluid ($kJ.kg^{-1}.K^{-1}$)
(tsi−tso)=temperature change of the heat transfer fluid in (e.g. 1° C. in this example)

The next step is to determine the diameter of the pipe. For this, a diameter is selected such that a tolerable pressure drop in the pipe is obtained. High pressure drops are preferred since these are associated with turbulence and rapid control response. The heat transfer fluid flowrate m ($kg.s^{-1}$) can be estimated from a graph of flowrate versus pressure drop. In practice this step needs will be iterative since the true length (and hence total pressure drop) will not be known at this stage and a guessed value must be used.

The next step is to determine the area of the coil using the formula below:

$$Q = U.A.LMTD$$

Where
Q=nominal process load (100 Watts for this example)
U=overall heat transfer coefficient ($W.m^{-2}.K^{-1}$)
A=heat transfer area ($m^2$)
LMTD=Log mean thermal difference between the process and heat transfer fluid (K)

The overall heat transfer coefficient (U) can be calculated or obtained from measured data.

The LMTD is calculated from the following:

$$LMTD = [(T_p - t_{si}) - (T_p - t_{so})] / \ln[(T_p - t_{si})/(T_p - t_{so})]$$

Where
Tp=process temperature
Tsi=temperature of heat transfer fluid in
Tso=temperature of heat transfer fluid out By knowing the area and diameter of the coil, the length can be calculated using simple geometry. The pressure drop should now be checked against the true length. If pressure drop is too high or too low, a new pipe diameter should be selected and the calculation repeated.

This information may then be used to determine the optimum diameter to length relationship of an individual coil whereby high turbulence is achieved without incurring excessive pressure drop of heat transfer fluid through the heat exchanger (as shown by a high Reynolds number). In the systems of the present invention it is preferred that:

a. the linear velocity of heat transfer fluid must be reasonably high
   (preferably >0.1 $m.s^{-1}$) in order to maintain satisfactory control response and a good overall heat transfer coefficient.
b. the pressure drop of heat transfer fluid flowing through the coil is from 0.1 to 20 bar.

In practice, optimum coil lengths will vary according to the temperature differences employed and the thermodynamic and physical characteristics of the system. Calculating optimal coil length is an iterative process. A general-purpose device will be sized using conservative data based on fluids with low thermal conductivity and a low temperature difference between the reaction fluid and the heat transfer fluid. Each coil will have a limited operating range.

In a preferred system in which the heat transfer equipment is capable of stable operation over a wide range of energy releases, the system is such that the area of heat transfer may be varied according to the needs of the particular load. This may be conveniently accomplished by providing multiple heat transfer pipes each of which has a diameter and length relationship designed to provide a certain degree of heat transfer. In the preferred multiple pipe system, the pipes may be brought into and out of operation, as the needs of the system dictates.

DETAILED DESCRIPTION OF THE PREFERRED EMBODIMENTS

Figure 1:
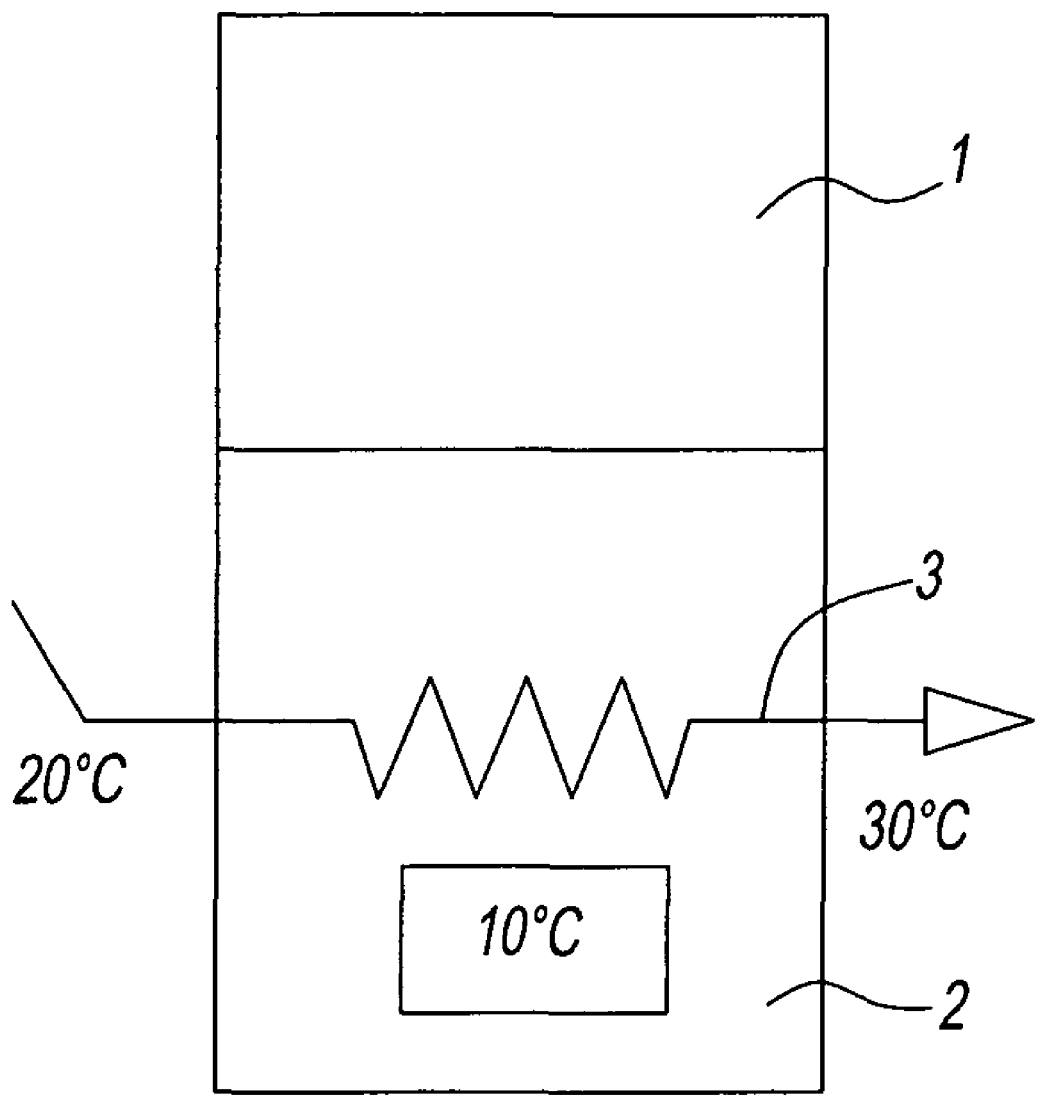
FIG. 1 illustrates a schematic drawing of a reaction vessel served with a single heat transfer coil.
Figure 2:
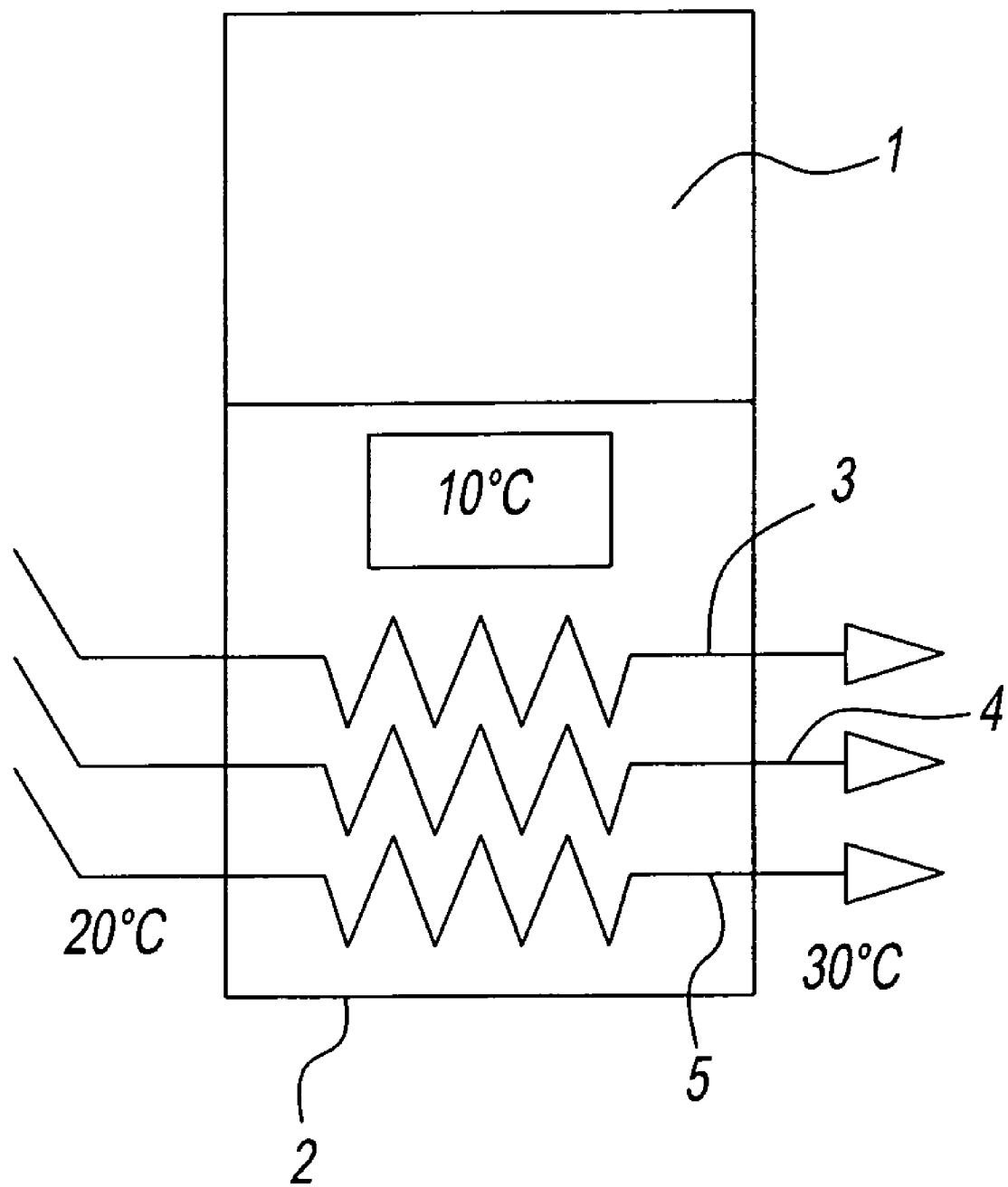
FIG. 2 illustrates a reactor with an improved range having three coils.

The system of the present invention is described with reference to a chemical reactor as shown in the accompanying drawings in which FIG. 1 is a schematic illustration of a reaction vessel served with a single heat transfer coil (of specified diameter). FIG. 2 is a schematic illustration of a comparable reactor served with three heat transfer coils to provide variable heat transfer.

FIG. 1 is a schematic illustration of a reactor (1) containing a process fluid (2) and a cooling coil (3) which is three meters long. This system is capable of controlling temperature at energy liberation rates of between 72 and 260 Watts by varying the flow rate of the heat transfer fluid.

The reactor in FIG. 2 has an improved range of up to 780 watts. The versatility has been increased by adding two more coils (4) and (5). When one coil is operating the system can be controlled with heat generation in the range of 72 to 260 watts (as in the reactor of FIG. 1); With all three coils operating (at a nominal maximum flow) the system can be controlled with a high degree of accuracy with heat generation up to 780 watts.

In normal operation, the flow of heat transfer fluid to a coil (or set of coils) will be increased using a flow control valve. When a new coil switches in to accommodate a rising load, the control valve will regulate the flow to ensure smooth transition to the higher flow. This will require a rapid flow control response to the step change in the system pressure drop. To provide a smooth transition between operating conditions and wide operating range a large number of coils is desirable. A multi port flow control valve as described in our PCT Patent Application PCT/EP02/09806 will be particularly useful.

Instrumentation is a key aspect of successful operation of the systems of the present invention. Accurate and sensitive instrumentation must be used for measuring temperatures and the rate of flow of the heat transfer fluid. Instruments must operate over a wide range of flows and this may be achieved by breaking up the coil system into separate modules operated by manifolds. This enables different coils to be brought into or out of operation, according to the needs of the system.

Fast and accurate temperature measurements is a key performance requirement. To achieve this, the temperature element is conveniently mounted where liquid turbulence is high.

In a preferred process, in addition to the normal process temperature transmitters, which constantly measure the process across its entire range and provide the necessary safety interlocks, a second pair of temperature elements can be provided to monitor the specific process set point. The arrangement uses two different types of measuring elements. The main device is preferably an RTD, a 4 wire Pt100 RTD to $1/10^{th}$ DIN standard being especially suitable. The transmitter used to provide the 4-20 mA output signal is spanned to the minimum allowable for the transmitter (similarly any output signal type or temperature span could be used). The temperature transmitter will be calibrated specifically at the process set point. Larger ranges will still give acceptable results, but reducing the span to the minimum possible offers improved accuracy and resolution. Thus this arrangement will provide an extremely accurate means of process temperature measurement.

The element of the temperature measurement system is the part of the device which is in contact with the liquid. In the case of an RTD, its resistance will change in response to changing temperature. The response of an RTD is not linear. The transmitter is the calibrated part of a measuring device and is used to linearise the output to the control system and convert the signal to an industry standard, usually 4-20 mA, but it could also be 1-5 V or 0-10V. A thermocouple's response to a change in temperature is a varying voltage. Usually milli volts per ° C. A thermocouple transmitter will again convert this signal to an industry standard, again more often than not, 4-20 mA. Accordingly the term 'element' when describing a physical mechanical presence in the process, e.g., a temperature element is located in the reactor and measures the temperature of the reactor contents. And the term "transmitter" when describing aspects of temperature measurement relating to the control system, e.g., a temperature transmitter is calibrated 0-100° C. and displays the contents temperature of the reactor.

The limitation of any RTD is its speed of response to a step change in temperature. Typically it can take up to four or five seconds for an RTD to measure a change in temperature. Thermocouples, on the other hand, can respond much more rapidly to temperature fluctuations. For this reason a thermocouple is also used to monitor the process set point, a T type thermocouple being especially suited. Its transmitter will be similarly ranged to the RTD. However, as a T type thermocouple has an accuracy of only + or −1° C., it will not be used to monitor the process temperature. Its function is to monitor the rate of change of the process temperature.

The combined use of these two different types of sensing elements provides a temperature control system, which is both extremely accurate and responsive. It should be noted that not all process operations require this level of temperature measurement accuracy and control. In such cases, more basic temperature control and measurement systems will prove tolerable.

In order to fully utilize this two-element approach, custom software is used to determine which process variable (temperature, or rate of change of temperature) is the most significant at any one instance in time.

Conventional reactors for example have fixed area heat transfer surfaces (or occasionally several elements such as separate sections on the bottom dish and walls). They perform most effectively with a high and constant flow rate of heat transfer fluid to the jacket (or coils). Process temperature is controlled by varying the heat transfer fluid temperature. In the preferred system of the present invention used to control chemical and physical reactions, the area of the heat transfer surface may be varied according to the needs of the reaction (although some variation in heat transfer fluid temperature can also be used).

Figure 3:
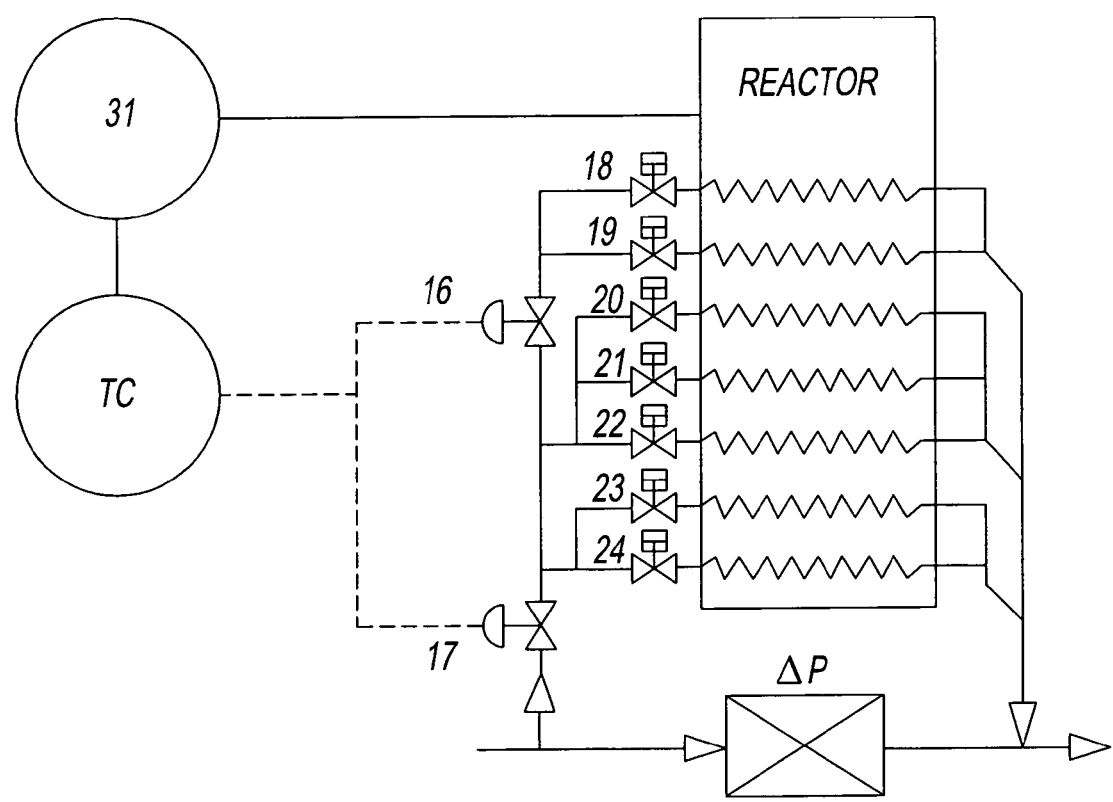
FIG. 3 illustrates a control arrangement for the heat transfer fluid using a variable area heat transfer surface.

A typical control arrangement for control of the heat transfer fluid using a variable area heat transfer surface is shown in FIG. 3. In FIG. 3, valves (16) and (17) are control valves that regulate flow of heat transfer fluid to the heat transfer coils. The extent to which they are open is determined by a temperature output measure from the reactor (or vessel). With the process at idle, valve (18) is open and sufficient flow permitted to compensate for heat gain from the agitator. As load is applied to the process, valve (16) opens to permit the flow of more heat transfer fluid. When valve (16) is open beyond a pre-set point (or when flow rate dictates) valve (19) will open and valve (16) will close up slightly to compensate. As valve (16) approaches the top of its control range, valve (17) takes over. As valve (17) progressively opens the valves (18) to (24) are opened in a cascade fashion.

The heat transfer fluid is applied to the control equipment at constant pressure and temperature. In some cases temperature can also be varied where it is necessary to increase the operating range.

The rate at which heat can be transferred between the process fluid and the heat transfer fluid is dictated (in part) by the overall heat transfer coefficient (U). The larger the value of U, the smaller the heat transfer area required. The U value may be calculated from three components.

The heat transfer resistance through the process fluid boundary layer

The heat transfer resistance through the coil wall

The heat transfer resistance through the heat transfer fluid boundary layer

The boundary layers are the stagnant layers of liquid either side of the coil wall. The faster the agitation (or liquid flow), the thinner the boundary layer. Thus high liquid velocities give better heat transfer. Also liquids with good thermal conductivity give better heat transfer through the boundary layers.

Heat transfer mechanism across the coil wall is similar, except (unlike the boundary layers) the distance through which the heat has to conduct is fixed. Higher heat transfer rates are achieved where the coil material has high thermal conductivity. Higher heat transfer rates are also achieved where the coil material is thin.

Thus a high U value requires both a thin coil material (with high thermal conductivity) and turbulent conditions in both liquids (the more turbulent, the better). The higher the U value, the smaller the area required for heat transfer. This means a shorter heat transfer coil.

It is therefore preferred to use the thinnest walled coils possible without compromising mechanical strength and corrosion tolerance. A typical wall thickness would be ½ to 4 mm.

The material from which the coil is fabricated is not critical but they should be inert to the medium whose surface is to be controlled and have high thermal conductivity.

For purposes of illustration only the following examples show the sizing of the heat transfer coils.

Example 1 illustrates the sizing an individual heat transfer coil such as that used in FIG. 1. Examples 2 and 3 illustrate the sizing and use of multiple heat transfer coil systems. These two examples also employ the additional feature of also providing caloimetric data.

In these examples some of the numbers used are arbitrary and are chosen for purposes of illustration only. The examples illustrate the sizing of coils for a batch reactor where an exothermic reaction takes place. In this, a theoretical reaction reagent A is reacted with product B to produce a new compound C as follows:

$$A+B \rightarrow C$$

where
A=kg of A
B=kg of B
C=kg of C
The heat liberated ΔHr is as follows:

$$\Delta Hr_c = 1,000 (kJ/kg_c) \quad (1)$$

The batch reactor is prefilled with component B. Component A is added slowly (alternatively the two components could be pumped continuously through the reactor in the desired ratios). For the purposes of this example it is assumed that it is a fast reaction and component B reacts immediately on contact with A. The heat liberated is therefore proportional to the rate of addition (of A). If it is assumed that the addition rate is such that 0.001 kg/second of C is produced The heat load of the reactor (q)=0.001×1000=1 kW.

The reaction is also assumed to take place at constant temperature so that the heat load on the cooling fluid is also 1 kW.

Figure 4:
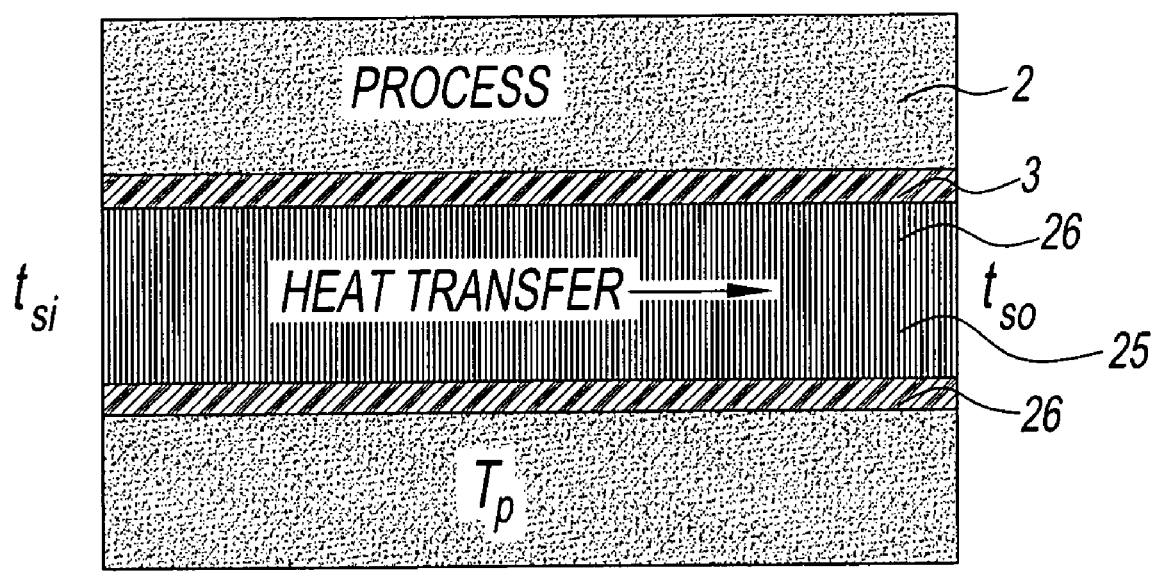
FIG. 4 illustrates a schematic drawing of a section through a heating/cooling coil such a shown in FIG. 1.

FIG. 4 is a schematic illustration of a section through a typical heating/cooling coil such as coil (3) of FIG. 1 in the process fluid (2) through which flows the heat transfer fluid (25). The boundary layer is shown at (26) and it is this boundary layer which is kept as thin as possible by ensuring turbulent flow in the heat transfer unit.

Example 1

The heat transfer coil (3) controls the process temperature. The temperature difference between the heat transfer fluid and the process fluid must be as high as possible, but not so great that boiling, burning or freezing occur on the pipe surface. Assume that the process media temperature is 30° C. ($t_p$). Also assume that the lowest temperature at which service fluid can be delivered to the system is 5° C. (to avoid freezing on the outer surface). Thus the service fluid inlet temperature ($t_{si}$) is 5° C. and the outlet temperature ($t_{so}$) is 15° C. [since ($t_{si}$-$t_{so}$) is 10° C.].

Once the choice for ($t_{si}$-$t_{so}$) is made, the mass of the heat transfer fluid can be determined as follows:

$$m = q/Cp(t_{si}-t_{so}) \quad (1)$$

where
m=mass flow of heat transfer fluid (kg/s)
q=heat gain by the heat transfer fluid=1 (kW) (in this 1 kW is the heat of reaction)
Cp=specific heat of heat transfer fluid=1.6 kJ.kg$^{-1}$.K$^{-1}$ (based on the choice of the synthetic heat transfer fluid)
($t_{si}$-$t_{so}$)=temperature change of heat transfer fluid (selected to be 10° C.)

Thus from equation (1), the mass flow (m)=1/1.6×10=0.0625 kg/s

Assume the density of the heat transfer fluid=840 kg/m$^3$.

Thus the volume flowrate of the fluid (W)=0.0625/840=0.000074 m$^3$/s

Optimising coil geometry and the velocity of the heat transfer fluid is an iterative process. Low velocity of the heat transfer fluid through the heat exchange coil gives rise to poor control and measurement response. Low velocity also results in a large ratio of thermal mass of heat transfer fluid to heat load. This tends to magnify any errors of temperature measurement. High liquid velocity is desirable as it gives faster control response and a better ratio of thermal mass to heat load. As the velocity is increased however, the pressure drop through the coil gets higher.

Accordingly the optimum coil will be long enough to give adequate heat transfer area without incurring an excessive pressure drop. If the diameter is too small, the pressure drop will be too high (due to high liquid velocity and long pipe length). If the diameter is too large, the liquid velocity will be too low.

In this example an initial calculation based on a 4 mm diameter pipe is made for the first iteration as follows:

At a flowrate of 0.000074 m$^3$/s through a 4 mm bore pipe, the pressure drop of the heat transfer fluid is calculated as being 1.24 bar/m (based on synthetic heat transfer fluid).

The pipe length is calculated from the relationship $$L = A/\pi D (m)$$

where
L=pipe length=(m)
A=surface area of pipe (m$^2$)
D=pipe diameter=0.004 (m)
π=3.1416

The surface area (A) required for control of the reaction is determined from the heat transfer capabilities of the pipe as follows:

$$A = q/U.LMTD (m^2)$$

where
A=surface area of pipe (m$^2$)
U=overall heat transfer coefficient=0.730 (kW.m$^{-2}$.K$^{-1}$) (estimate for organic process fluid and synthetic oil heat transfer fluid)
LMTD=$[(T_p-t_{si})-(T_p-t_{so})]\ln[(T_p-t_{si})/(T_p-t_{so})]$ (° C.) (log mean thermal difference between process and service fluids)

Also $T_p=30$
$T_{si}=5$
$T_{so}=15$
Thus LMTD=19.6 (° C.)
Therefore A=1/(0.730×19.6)=0.07 m² (m²)
Therefore L=0.07/(3.1416×0.004)=5.6 (m)
The pressure drop through the line=5.6×1.24=6.9 bar
The linear velocity can also be calculated using the continuity equation as follows:

$$V=W/A$$

where

V linear velocity (m/s)
W=volume flowrate (m³/s)
A=cross sectional area of the pipe (m²)
Thus V=0.000074/(π×0.004²/4)=5.9 (m/s)
A summary of the results of this calculation is shown in Table 1 below.

TABLE 1

| Coil duty | 1 kW |
|---|---|
| Pipe diameter | 4 mm |
| Liquid flowrate | 0.074 l/s |
| Liquid velocity | 5.9 m/s |
| Pipe length | 5.6 m |
| Pressure drop | 6.9 bar |

The table shows that although the 4 mm diameter coil is capable of operating in a reaction that generates 1 kW of heat, it does so at the expense of very high pressure drop (of the heat transfer fluid). A small increase in process load beyond 1 kW would require even higher flowrates and a longer coil which would result in an unacceptably high pressure drop. Thus under the conditions which have been chosen purely for the purposes of illustration, at a load of 1 kW the 4 mm diameter coil is at the top end of its operating range.

A larger pipe diameter of 5 mm internal bore is therefore selected for the second iteration.

At a flowrate of 0.000074 m³/s through a 5 mm bore pipe, the pressure drop of the heat transfer fluid is 0.42 bar/m (based on a standard pressure drop calculation synthetic heat transfer fluid).

The pipe length is again calculated from the relationship $$L=A/\pi D$$

where

L=pipe length=(m)
A=surface area of pipe (m²)
D=pipe diameter=0.005 (m)
π=3.1416

The required area (A) is determined from the heat transfer capabilities of the pipe using the same formula $$A=q/U.\text{LMTD}(m^2)$$

as was used in the first iteration.

With the 5 mm coil however, (note the value of U is lower in this case (0.66 kW.m⁻².K⁻¹) this is due to the reduced service fluid velocity (which gives a higher service side boundary layer resistance).

$$A=1/(0.66\times19.6)=0.077\ m^2$$

$$L=0.0771(3.1416\times0.005)=4.9\ m$$

The pressure drop through the line=4.9×0.42=2.1 bar.
Also the new velocity is calculated as follows: Thus V=0.000074/(π0.005²/4)=3.8 (m/s)
The results of this second calculation are shown in Table 2.

TABLE 2

| Coil duty | 1 kW |
|---|---|
| Pipe diameter | 5 mm |
| Liquid flowrate | 0.074 l/s |
| Liquid velocity | 3.8 m/s |
| Pipe length | 4.9 m |
| Pressure drop | 2.1 bar |

The 5 mm diameter coil therefore offers good linear velocities and a moderate pressure drop. Such a coil would therefore be useful for controlling the temperature of the reaction used for the purposes of this example. The velocity is also well above the minimum preferred value (1 m/s).

To be of practical service, a heat transfer coil needs to operate over a range of conditions as opposed to being limited to one specific heat transfer rate. Table 3 shows the performance of the 5 mm diameter coil under a variety of conditions (for organic process fluid and synthetic heat transfer oil). The one constant in the table is that the temperature change of the heat transfer fluid flowing through the coil ($t_{si}-t_{so}$) is always 10° C.

TABLE 3

| | CALCULATED COIL LENGTHS FOR A 5 mm ø COIL | | | | | | | |
|---|---|---|---|---|---|---|---|---|
| Pressure Drop (bar/m) | Heat capacity (W) | Flow (l/s) | Velocity m/s | LMTD 5° C. (m) | LMTD 10° C. (m) | LMTD 15° C. (m) | LMTD 20° C. (m) | LMTD 25° C. (m) |
| 0.1 | 457 | 0.033 | 1.7 | 8.9 | 4.4 | 2.9 | 2.2 | 1.8 |
| 0.25 | 761 | 0.055 | 2.8 | 12.4 | 6.2 | 4.2 | 3.0 | 2.5 |
| 0.50 | 1121 | 0.081 | 4.1 | 17.2 | 8.6 | 5.7 | 4.3 | 3.5 |
| 0.75 | 1439 | 0.104 | 5.3 | 20.8 | 10.4 | 6.9 | 5.2 | 4.2 |
| 1.00 | 1660 | 0.120 | 6.1 | 23.6 | 11.8 | 7.9 | 5.9 | 4.8 |

The first column in Table 3 shows pressure drop (per metre of coil) through the coil for a given flow rate. The second column gives the heating or cooling capacity of the coil based on the 10° C. temperature change. The third and fourth columns give the volume flow rate and velocity of the liquid. The last five columns give minimum coil lengths required for the quoted LMTD values. The LMTD temperature values quoted at the top of these columns represent the log mean temperature difference between the heat transfer fluid and the process fluid.

It can be seen from Table 3 that different coil lengths are used depending on process heat load and log mean temperature difference between the process and service fluids. Table 3 shows that a large temperature difference is beneficial as it requires shorter coil lengths.

From Table 3, a good general-purpose coil would be 5.9 meters in length. This would be capable of serving any of the duties contemplated in Table 3 where the required coil length was 5.9 meters or less. It would be suitable for a process load of 1.66 kW providing the difference in temperature between process and heat transfer fluid was at least 20° C. Under these conditions the pressure drop through the coil would be 5.9 bar.

The coil also offers adequate heat transfer area and reasonable control response at heat loads down to 0.46 kW. Although low velocities are tolerable the control system becomes increasingly sluggish with low flows. Also low velocities result in a large ratio of thermal mass (of heat transfer fluid) to heat load. This tends to magnify any errors of temperature measurement. High liquid velocity is therefore desirable as it gives faster control response and a better (lower) ratio of thermal mass (of the heat transfer fluid) to heat load.

For the reasons given above, high heat transfer fluid velocities are generally desirable. Very high pressure drops however also introduce greater energy from turbulence and friction. There are also practical equipment constraints on how fast a liquid can be pumped through a pipe. The single coil system of 1 is useful, but has its limitations.

As Table 1 illustrates, a single coil has an optimum operating range. Although it is capable of controlling a range of heat transfer rates, it has its limitations. As Table 3 shows, at heat transfer rates above 1121 W, the pressure drop across the coil increases rapidly due to the need for increasingly longer pipes and higher pressure drops per meter of pipe length.

The limitations of the single coil may be illustrated as follows:

A coil 6.2 m long operating with an LMTD (log mean temperature difference between the process fluid and service fluid) of 10° C. has a nominal operating range of 457-1121 W. At maximum load, the pressure drop across the coil would be 1.55 bar. If this coil was to be used with a heat load of 1660 W under the same conditions, it would have to be 11.8 meters long and the corresponding pressure drop would be 11.8 bar. If, under the same conditions, the LMTD was reduced to 5° C., the pipe would need to be 23.6 meters long and the resulting pressure drop would be 23.6 bar.

Although the range of a coil can be increased by varying the inlet temperature ($t_{si}$), there are limitations. If the temperature difference ($t_{si}-t_{so}$) is reduced, the system becomes progressively less accurate due to limitations of the temperature measuring devices. If the temperature difference ($t_{si}-t_{so}$) is expanded too far, there is a risk of freezing the process fluid (or surface boiling or heat damage where heat is being absorbed by the process fluid).

Although service fluid flow and supply temperatures are both parameters that can be varied to alter the operating range, reliable control methods favour using one control parameter at a time (and step changing the other where necessary).

The 5 mm diameter coil illustrated in Table 1 gives a turn down ratio of approximately 2.5 (1121/457). If the temperature difference across the coil ($t_{si}-t_{so}$) was increased from 10° C. to 20° C., the turn down ratio could be increased to 5. An alternative method of increasing the operating range of the system is to use multiple coils in a cascade fashion which provide a variable area heat transfer surface. Such a system is illustrated by the following

Example 2

Example 2 illustrates, the design of variable area heat transfer systems employing multiple coil systems such as that illustrated in FIG. 2.

Example 2 addresses the fact that a reactor might be required to handle exothermic reactions which generate heat in the range of 500 to 15,000 W. A range of this size exceeds the operating capabilities of the single heat transfer coil system illustrated in 1. Such a reactor can however be effectively operated using multiple coils as illustrated in this example (in this example identical coils each 11.8 m long are used) in a cascade fashion. With one coil operating with the heat transfer fluid at 1.7 m/s, a heat load of 457 W will give a temperature rise in service fluid ($t_{si}-t_{so}$) of 10° C. If, under the same conditions the velocity of the heat transfer fluid is increased to 6.1 m/second the capacity rises to 1,660 W (see 3). If two coils are used at maximum flow the capacity is 3,320 W. By adding coils in this manner ever greater heat loads can be measured. If, for example, ten coils are used at the maximum flow, the capacity is 16,600 W. This system therefore offers a turndown ratio of approximately 36 (16,600/457). Accordingly, by varying the velocity of the fluid and the number of coils, the heat capacity can be measured with a high degree of accuracy over a wide range.

The devices described so far have turndown capacities of up 36. In practice, a turndown of 1000 or more may be desirable. This could be important with a batch reaction where the end point needs to be identified with precision. Alternatively, high turndown would be useful for process operations that switch from batch to continuous operation. In other cases, the same piece of equipment might be used on multiple applications of widely varying energy release (or absorption) rates. Whilst the device previously described has considerable use it has its limitation for this type of application, because an impractical number of coils would be needed. Therefore an alternative embodiment of the invention uses a plurality of coils for varying surface area as illustrated in Table 3.

Example 3

Table 4 sets out the heat transfer capacities of a series of coils of varying diameter and length.

TABLE 4

| Coil diameter (mm) | Coil length range (m) | Operating range (W) |
|---|---|---|
| 1 | 0.13-0.6 | 4-22 |
| 2 | 0.9-2.3 | 40-141 |
| 3 | 1.9-4.7 | 118-429 |
| 4 | 3.0-7.8 | 249-913 |
| 5 | 4.4-11.8 | 457-1660 |

In order to arrive at the operating range, as with Examples 1 and 2, the LMTD is taken as 10° C. and ($t_{si}-t_{so}$) as 10° C. The extremes of the ranges set out in columns two and three of Table 4 represent the calculated values for minimum and maximum flow of the heat transfer fluid. Minimum flow is that which results in a pressure drop (of service fluid) of 0.1 bar.m$^{-1}$ and maximum flow that which results in a pressure drop (of service fluid) 1 bar.m$^{-1}$.

This combination of coil diameters and lengths provides a system capable of very high turndown rations. For example a six coil reactor can be designed to operate at less than 4 W and up to 5000 W. Table 5 shows the cumulative capacity of 6 coils of varying diameter.

TABLE 5

| Coil number | Coil diameter (mm) | Coil range (W) | Cumulative range (W) |
| --- | --- | --- | --- |
| 1 | 1 mm | 4-22 | 4-22 |
| 2 | 1 mm | 4-22 | 4-44 |
| 3 | 2 mm | 40-141 | 4-185 |
| 4 | 3 mm | 118-429 | 4-614 |
| 5 | 5 mm | 457-1660 | 4-2274 |
| 6 | 5 mm | 457-1660 | 4-3934 |

Each coil is sized for the maximum length shown in Table 4. The nominal turndown ratio of the six coils is 984.

If $(t_{si}-t_{so})$ is stepped down to 5° C. when a single 1 mm diameter coil is operating, the nominal turndown ratio is increased to 1967 (2–3934 W).

If $(t_{si}-t_{so})$ is stepped up to 20° C. when all the coils are operating the nominal turndown ratio is increased to 3934 (2–7868 W).

Whilst coil sizing and systems operation have been illustrated in relation to the control of reaction temperatures they are equally applicable to any temperature control system.

The examples cited above are relatively crude approximations of variable area. Although they utilise variable area, they still exploit varying degrees of conventional flow/temperature control philosophies. In practice, the smaller the incremental steps of the heat transfer coils, the nearer the system becomes to a true variable area device. The benefits of the true variable area system are smooth simple control, small thermal inertia of individual coils and good thermal gradient throughout the operating range. Conventional control valves become very complex as the number of coil increments is increased. For this reason, the valve shown in FIG. 5 offers an effective means of controlling a large number of coils with a single actuator. Conduits of the temperature control system of the present invention may be opened and closed by the valve system described in our Patent Application reference PAAMBA096 filed Aug. 31, 2001, which provides a valve for the control of the delivery of fluids to two or more conduits in a cascade fashion wherein the valve has multiple outlet ports operating in a cascade wherein the outlet ports are opened and/or closed according to a signal expressing the requirement for fluid in the conduits.

These valves can be designed to provide the same control characteristics as a conventional control valve for each of its multiple outlet ports and as such can be used to replace multiple conventional valves with a single multi-port flow valve having a single means of activation requiring one control signal only as opposed to multiple valves and actuators and at least one control signal per control valve.

The multi-port flow control valve can therefore be constructed to operate either with a linear or rotary action. The number of outlet ports will depend on the number of individual flows, which need to be independently controlled. In the example illustrated in FIG. 3, 6 connections for heat transfer coils are shown, but the valve of the present invention can be designed for use with any number of coils. By modulating the multi-port flow control valve the effective heat transfer area in the reactor can be varied. The maximum number of outlet ports on this type of valve is limited only by the physical constraints of the construction.

Figure 5:
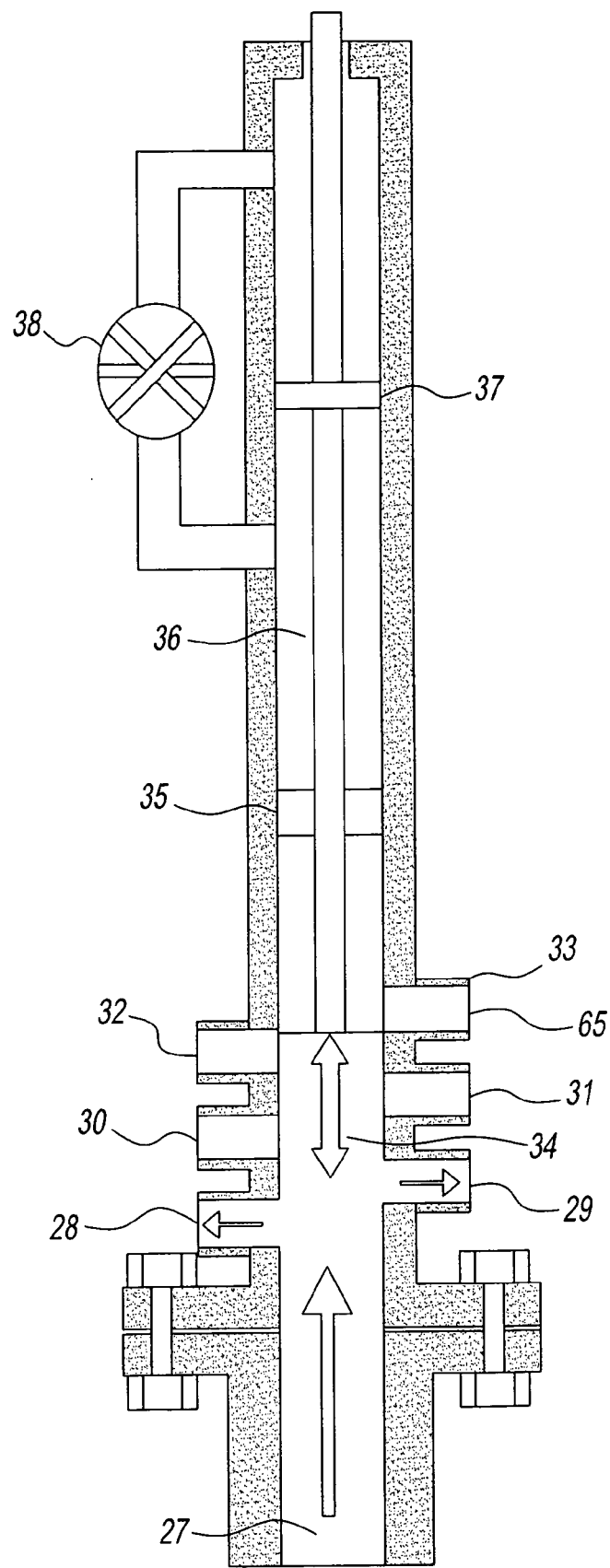
FIG. 5 illustrates a multi-port flow control valve.

FIG. 5 shows a multi-port flow control valve which can be used with the present invention in which (27) is the inlet port for heat transfer fluid, (28 to 33) are the outlet ports, (34) is the plunger. The Figure shows the plunger position with outlet port (28) open, outlet port (29) partially open and outlet ports (30 to 33) closed. (35) is the seal between the heat transfer fluid and hydraulic fluid employed in the actuator shaft (36) and (37) is the actuator piston whose position is determined by a bi-direction variable speed hydraulic pump (38) which drives the shaft up and down the valve body to open and close the outlet ports. The arrows in FIG. 5 show the flow of the heat transfer fluid.

Figure 6:
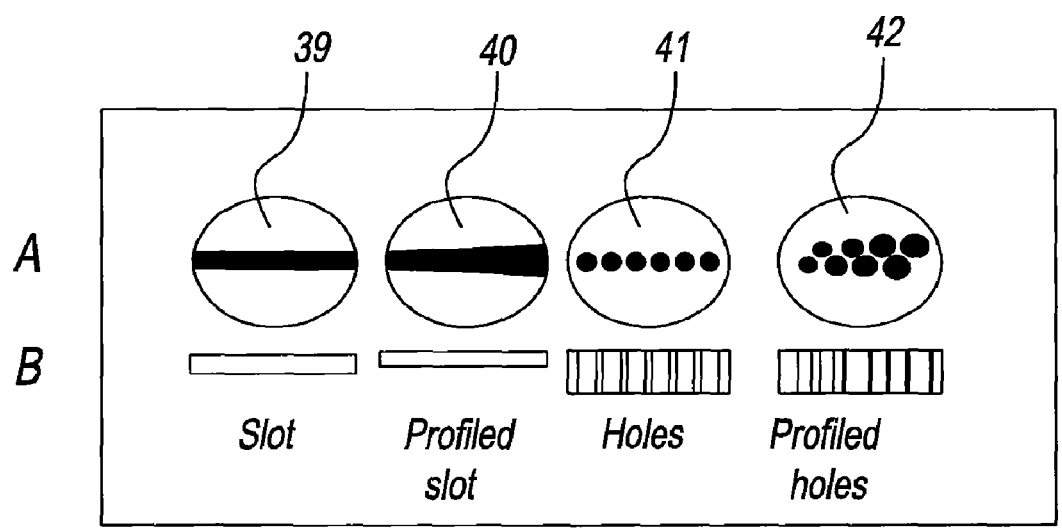
FIG. 6 illustrates various options for valve orifices of the valve of FIG. 5.

FIG. 6 shows various options for the valve orifices (39 to 42) of the valve ports (28 to 33) of FIG. 5. (39 to 42 A) is the plan view of the orifices and (39 to 42 B) shows the same orifices in section view.

In some designs the port openings on the valve may overlap, whilst in others the port openings may open in separate discreet steps.

The invention can be used in any system requiring temperature control. It is however particularly useful for improving the operation of commercial chemical and physical reaction systems. It can however also be used to provide considerably smaller reaction systems with comparable commercial throughput. For example the invention enables reduction of reactor size by a factor of 10 and, in some instances, a factor of 100 or greater. In particular it can be applied to current commercial

- batch organic synthesis reactions currently carried out in reactors of 10 to 20,000 liters.
- bulk pharmaceutical synthesis reactions currently carried out in reactions of 10 to 20,000 liters.
- batch polymerisation reactions currently carried out in reactors of 10 to 20,000 liters.
- batch synthesis reactions of 10 to 20,000 liters currently used for unstable materials (compounds susceptible to self-accelerating runaways)
- batch inorganic synthesis reactions currently carried out in reactions of 10 to 20,000 liters.

The techniques may also be useful in larger scale chemical and petrochemical operations.

The combination of ability to vary the area of the heat transfer surface and the use of turbulent plug flow in the heat transfer fluid enables the creation of a high thermal gradient between the heat transfer fluid and the medium whose temperature is to be controlled. This, in turn enables a fast and accurate response to fluctuations in the temperature of the medium allowing rapid response and the ability to maintain highly accurate temperature control. These systems enable the LMTD to be maintained stable and constant at high levels. The LMTD should be as high as possible and we prefer that it be greater than 1° C., preferably greater than 10° C., more preferably greater than 20° C. even more preferably greater than 100° C. The LMTD that can be attained depends upon the temperature of the medium that is to be controlled. The optimum flow of the heat transfer fluid will depend upon the system including the nature of the fluid however, it is preferred that the fluid flows with a Reynolds number greater than 2000. Alternatively high linear velocities in the pipe should be maintained of greater than 0.1 m/s, more preferably greater than 1 m/s or even more preferably greater than 3 m/s. This is important with small-bore pipes as a high Reynolds number may be difficult to achieve.

As stated, the techniques of the present invention may be used in any systems employing temperature control. Any industrial process in which heat is absorbed or released during physical or chemical change may be controlled by these techniques. For example, the techniques may be used to control the temperature of reactors, crystallisers, evaporators, driers, fermenters, stills, vapourisers and gas evaporators. The techniques may also be used in industrial and domestic processes requiring a controlled temperature, such as in liquid heating and cooling systems and storage and transportation of solids, liquids and gasses. The techniques of the present invention may also be used in utilities such as heating and ventillation systems, air conditioning and chilling and refrigeration.

We claim:

1. A system for the control of the temperature of the contents of a batch reactor contained in a reaction vessel, wherein the temperature control element comprises:
   a plurality of conduits located on an outer surface of said reaction vessel;
   a temperature sensor that produces a temperature signal indicative of a temperature of the contents of the reactor or a rate of change of the temperature of the contents of the reactor; and
   a valve having a plurality of ports and a movable element that provides access of heat transfer fluid through said plurality of ports to said plurality of conduits, wherein movement of said movable element is determined by said temperature signal and such movement permits flow of heat transfer fluid in successive conduits of said plurality of conduits in a cascade fashion to thereby control the number of conduits containing heat transfer fluid that are in contact with said reaction vessel,
   wherein flow of heat transfer fluid controls the temperature of the contents of the reactor.

2. The system according to claim 1 in which the heat transfer fluid flows with a Reynolds number greater than 2000.

3. The system according to claim 1 wherein the heat transfer fluid is applied at substantially constant pressure and temperature.

4. The system according to claim 1, wherein said plurality of conduits comprise a series of individual coils, wherein individual coils are in fluid communication with a port of said valve.

5. A system according to claim 4 in which the individual coils are sized according the following formula:

$$A = m.Cp.(tsi-tso)/(U.LMTD)$$

Where
U=overall heat transfer coefficient ($W.m^{-2}.K^{-1}$)
Cp=specific heat transfer fluid ($KJ.Kg^{-1}K^{-1}$)
m=designated mass flowrate of the heat transfer fluid ($Kgs^{-1}$)
A=heat transfer area of the coil ($m^2$)
(tsi–tso)=designated nominal temperature change in the heat transfer fluid between inlet and outlet (° C.)
LMTD=designated nominal log mean thermal difference between the process and heat transfer fluid (C).

6. The system according to claim 5, wherein the heat transfer fluid temperature (tsi–tso) rises by 0.01° C. or more.

7. The system according to claim 6, wherein the heat transfer fluid temperature (tsi–tso) rises by 0.1° C. or more.

8. The system according to claim 7, wherein the heat transfer fluid temperature (tsi–tso) rises by 1° C. or more.

9. The system according to claim 8, wherein the heat transfer fluid temperature (tsi–tso) rises by 10° C. or more.

10. The system according to claim 1, wherein the linear velocity of the heat transfer fluid is greater than 0.1 $ms^{-1}$.

11. The system according to claim 1, wherein a linear velocity of the heat transfer fluid is greater than 1 $ms^{-1}$.

12. The system according to claim 11, wherein the linear velocity of the heat transfer fluid is greater than 3 $ms^{-1}$.

13. The system according to claim 12, wherein the linear velocity of the heat transfer fluid is greater than 5 $ms^{-1}$.

14. A system for the control of temperature of the
   contents of a batch reactor contained in a reaction vessel, wherein the temperature control element comprises
      a plurality of conduits located on an outer surface of said reaction vessel;
      a temperature sensor that produces a temperature signal indicative of a temperature of the contents of the reactor or a rate of change of the temperature of the contents of the reactor; and
      at least one valve that provides access of heat transfer fluid to a plurality of valves, wherein each of said plurality of valves control access to an individual one of said plurality of conduits, wherein the extent to which said at least one valve is opened to permit flow of heat transfer fluid to an individual valve of said plurality of valves is determined by said temperature signal, wherein a change of said temperature signal causes said at least one valve to adjust the flow of heat transfer fluid therethrough to permit or prevent access of heat transfer fluid to said plurality of valves to thereby control the number of individual conduits containing heat transfer fluid in a cascade fashion that are in contact with said reaction vessel,
      wherein flow of heat transfer fluid controls the temperature of the contents of the reactor.

15. The system according to claim 1, wherein said system can respond to a change in load of medium whose temperature is to be controlled within less than 2 seconds.

16. The system according to claim 1, wherein said system can respond to a change in load of the medium whose temperature is to be controlled within less than 10 seconds.

17. The system according to claim 3, wherein the nominal capacity of said heat transfer element is not more than 0.1 Watt.

18. The system according to claim 3, wherein the nominal capacity of said heat transfer element is not more than 1 Watt.

19. The system according to claim 3, wherein the nominal capacity of said heat transfer element is not more than 10 Watts.

20. The system according to claim 3, wherein the nominal capacity of said heat transfer element is not more than 100 Watts.

21. The system according to claim 3, wherein the nominal capacity of said heat transfer element is not more than 1000 Watts.

22. The system according to claim 3, wherein the nominal capacity of said heat transfer element is not more than 10000 Watts.

23. The system according to claim 3, wherein the nominal capacity of said heat transfer element is not more than 100000 Watts.

24. The system according to claim 8, wherein said plurality of coils comprises 5 or more coils.

25. The system according to claim 4, wherein said plurality of coils comprises 10 coils.

26. The system according to claim 3, wherein the temperature can be varied to increase the operating range.

27. The system according to claim 26, wherein the LMTD is greater than or equal to 10° C.

28. The system according to claim 27, wherein the LMTD is greater than or equal to 20° C.

29. The system according to claim 28, wherein the LMTD is greater than or equal to 100° C.

30. The system according to claim 1, wherein said medium is selected from the group consisting of a gas, a solid or a liquid.

31. The system according to claim 1, wherein said temperature sensor is disposed in said reactor contents to provide an instantaneous temperature of the reactor contents.

32. The system according to claim 1, wherein said temperature sensor is disposed in said reactor contents to provide a rate of change of temperature of the reactor contents.

33. The system according to claim 1, wherein said temperature sensor is disposed in said reactor contents to provide an instantaneous temperature of the reactor contents.

34. The system according to claim 1, wherein said temperature sensor is disposed in said reactor contents to provide a rate of change of temperature of the reactor contents.

* * * * *